United States Patent [19]
Owens

[11] Patent Number: 6,146,067
[45] Date of Patent: Nov. 14, 2000

[54] PIPE BEVELING ATTACHMENT FOR A POWER TOOL

[75] Inventor: Paul Owens, Inglis, Fla.

[73] Assignee: Innovative Tool Concepts, Inc., Port Charlotte, Fla.

[21] Appl. No.: 09/414,740

[22] Filed: Oct. 8, 1999

[51] Int. Cl.⁷ ...................................................... B23C 1/20
[52] U.S. Cl. ............................. 409/179; 30/122; 82/4 C
[58] Field of Search .................................. 409/134, 138, 409/140, 175, 178, 179; 30/122; 83/869, 574; 82/113, 4 C

[56] References Cited

U.S. PATENT DOCUMENTS

| | | | |
|---|---|---|---|
| 3,202,190 | 8/1965 | Gill | 144/1 |
| 3,699,828 | 10/1972 | Piatek et al. | 82/4 C |
| 3,817,649 | 6/1974 | Medney . | |
| 3,872,748 | 3/1975 | Bjalme et al. . | |
| 4,114,485 | 9/1978 | Coblitz et al. . | |
| 4,180,358 | 12/1979 | Uribe . | |
| 4,257,289 | 3/1981 | Groothius . | |
| 4,566,511 | 1/1986 | Robinson | 144/1 |
| 4,586,408 | 5/1986 | Goldner . | |
| 4,682,919 | 7/1987 | Mitchell . | |
| 4,889,454 | 12/1989 | Hillestad et al. . | |
| 4,907,920 | 3/1990 | Lund et al. | 409/132 |
| 4,915,552 | 4/1990 | Hillestad et al. . | |
| 5,007,778 | 4/1991 | Hillestad et al. . | |
| 5,020,401 | 6/1991 | Jiles . | |
| 5,076,122 | 12/1991 | Katzenburger et al. . | |
| 5,363,530 | 11/1994 | Dunn et al. . | |
| 5,393,176 | 2/1995 | Waring . | |
| 5,641,253 | 6/1997 | Wagner . | |
| 5,727,913 | 3/1998 | Naim | 409/138 |
| 5,853,272 | 12/1998 | Wartluft et al. . | |

Primary Examiner—A. L. Wellington
Assistant Examiner—Adrian M. Wilson
Attorney, Agent, or Firm—Dennis G. LaPointe; Mason & Assoc., P.A.

[57] ABSTRACT

A pipe beveling attachment for a rotary power tool including base means, an arbor sleeve adapter assembly for mounting the base means to the rotary power tool, bearing means in the base means for securing a shank of a pipe beveling rotary cutting tool, and alignment and guide means for cooperatively engaging a pipe wall of a pipe end to be beveled and for accommodating different diameter pipes including removable pins on each side of the pipe wall to provide a slidable cooperative engagement of the base means and pipe beveling rotary cutting tool with the end of the pipe to be beveled. The attachment includes a safety shield for an operator's protection and an optional flexible rotational stopper for preventing the attachment assembly from rotating when the power tool is at idle, generally a circular power saw. An alignment pin extending from the end of the arbor sleeve adapter assembly juxtaposed the power tool is optionally included to engage an aperture in a circular power saw retainer washer.

13 Claims, 6 Drawing Sheets

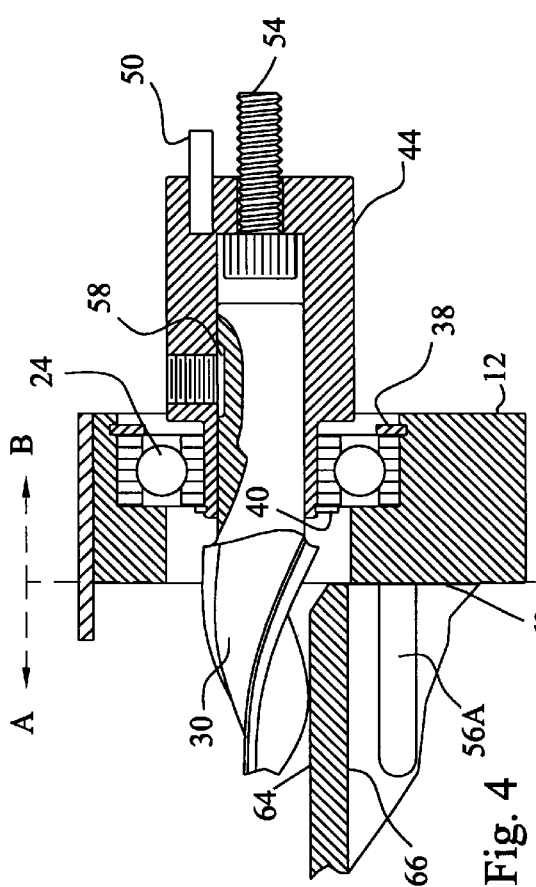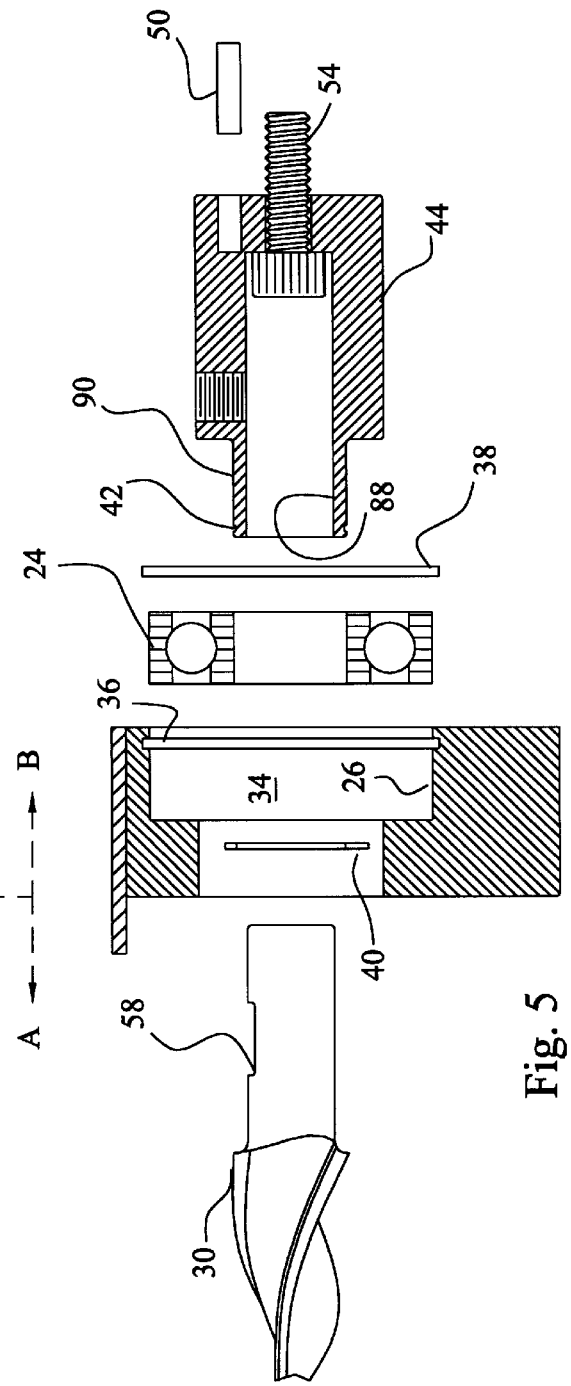

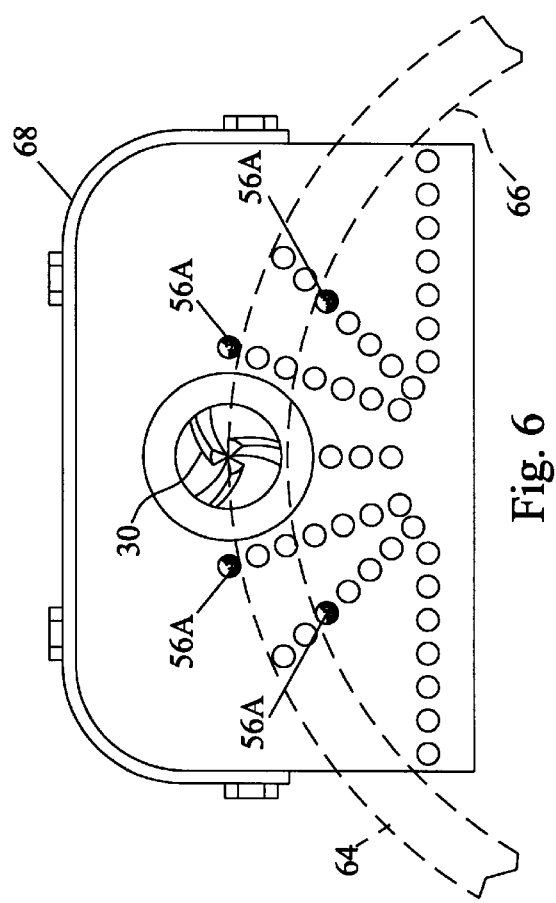
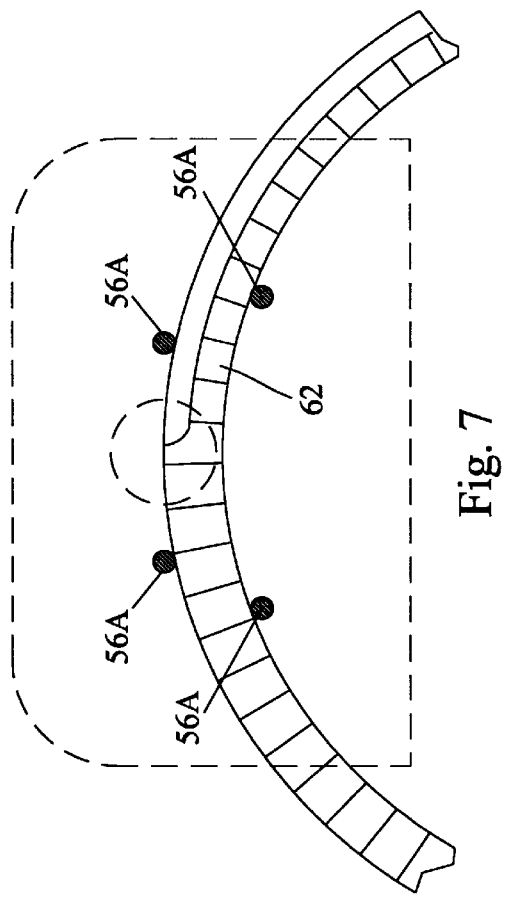

PIPE BEVELING ATTACHMENT FOR A POWER TOOL

BACKGROUND OF THE INVENTION

1. Field of the Invention

The invention relates to a power tool attachment for beveling pipe ends. It is especially related to an attachment for a power tool in which the power tool saw can cut the end of a relatively large diameter pipe and the attachment can then immediately bevel the end of the cut pipe.

2. Description of Related Art

It is often desirable when assembling cut sections of pipe, particularly water supply pipes and sewage pipes, most relatively large thick walled plastic pipes, to form a beveled end on at least one end of the pipe sections to facilitate gluing operations or to facilitate sliding the pipe end into a bell housing having an internal ring-type seal. Beveling such pipes in the field is generally a tedious and time consuming task. It therefore becomes desirable to obtain a tool by which consistent and relatively precise angular bevels may be produced quickly and efficiently at the cut end of the pipe.

Portable pipe chamfering or beveling devices which are adaptable to power tools are known in the art. However, most of these devices are restricted for use on plastic pipes only or are hand held and operated devices with which only relatively thin wall plastic pipes can be beveled. Generally none of these devices can bevel steel or thick-walled plastic pipes because of the powering means used or the cutting tool incorporated being inadequate to cut such materials or for an operator to properly handle. In addition, none of the prior art attachments are adaptable to a circular power saw tool in such a way that the blade remains on the saw for cutting the end of the pipe and the attachments can then be used to bevel the pipe end. Of course, the present invention may be used on any rotary power tool, including drill, portable and fixed lathes, and similar power tools.

Known related art includes a pipe beveling attachment for a drill or router power tool as depicted in U.S. Pat. No. 4,180,358 to Uribe; a portable pipe end beveling tool characterized as a portable lathe and powered by an auxiliary power drive as depicted in U.S. Pat. No. 4,257,289 to Groothius; and a hand held and operated tool for beveling pipe or tube ends as depicted in U.S. Pat. No. 3,872,748 to Bjalme et al. and U.S. Pat. No. 5,641,253 to Wagner. Other known related portable pipe beveling tools include U.S. Pat. No. 5,853,272 to Wartluft et al., U.S. Pat. No. 4,586,408 to Goldner, U.S. Pat. No. 4,682,919 to Mitchell and U.S. Pat. No. 3,817,649 to Medney.

None of the devices in the above references solve the problem of providing a light weight, portable attachment for use in the field wherein the attachment is mounted to a rotary or circular power saw in which the saw blade can be used to cut off an end of a pipe and the pre-installed attachment can immediately be used to chamfer or bevel the pipe end, particularly, relative thick walled pipe. In addition, none of the devices can be used to cut and bevel either steel or plastic pipe.

In the industrial water supply and sewage pipe installation field, the current method used to bevel pipe, particularly plastic pipe, is to first cut the pipe with a circular or reciprocating saw. Then the bevel is done by taking a circular power saw and angularly positioning the blade and dragging the blade along the circumference of the pipe end to form a chamfer or bevel. This method exposes an individual to an extremely dangerous condition as the circular power saw is generally heavy and cumbersome to use and the blade could easily kick back and cut the individual's leg. To minimize the risk of injury, two people will often get involved by having one hold and rotate the end of the pipe while the other performs the beveling. Further, using a saw blade in this manner, that is, applying a lateral pressure on the blade, can cause the blade to fracture potentially placing an operator at a greater risk for injury. Therefore, the present invention is intended to enable a single individual to safely and efficiently cut and bevel the pipe end.

The current method of adding a bevel to a pipe requires skill and experience and is often performed by a foreman taking him away from other duties. At best, the beveling results in a non-uniform bevel. At worst, the bevel is cut at an incorrect angle on all or a portion of the pipe circumference and if unnoticed could result in a failure to seal properly. The present invention assures a properly cut bevel by a single individual with minimal training and experience. Further, there is no delay incurred between cutting the pipe to a specific length and beveling the end because no disassembly or reassembly of the attachment is required. In addition, no clamping of the attachment to the pipe end is required thereby allowing the operator to quickly chamfer or bevel the end of the pipe immediately after cutting the pipe with the blade. Fabrication time is saved and associated construction costs is reduced with the present invention.

SUMMARY OF THE INVENTION

The present invention is a pipe beveling attachment for a rotary power tool. The attachment comprises base means having a planar first side and an opposite second side and an arbor sleeve adapter assembly for mounting the base means to the rotary power tool, the arbor sleeve adapter assembly including means for securing the arbor sleeve adapter assembly at one end to the rotary power tool.

Bearing means secured to the opposite second side of the base means are included, the bearing means being retained within the base means in a recessed area. The base means further include an aperture therethrough for receiving a pipe beveling rotary cutting tool, the aperture being concentric with the recessed area, wherein a shank of the pipe beveling rotary cutting tool may extend through the aperture from the planar first side of the base means, through an aperture of the bearing means and secured to the means for securing the arbor sleeve adapter assembly to the rotary power tool.

The planar first side of the base means includes pipe alignment and guide means for cooperatively engaging a pipe wall of a pipe end to be beveled, wherein the pipe alignment and guide means is adjustable to accommodate different diameter pipes. The pipe alignment and guide means include a plurality of holes, each at a predetermined depth in a predetermined spaced-apart relationship for receiving one of at least three removable elongate pins. Each of the at least three removable elongate pins is insertable into a predetermined one of the plurality of holes so as to slidingly engage the pipe wall of the pipe end to be beveled, two of the pins being radially spaced, one on each side of the pipe beveling rotary cutting tool and extending in a direction parallel to the pipe along an external surface of the pipe wall and at least one of the at least three pins extends in a direction parallel to the pipe along an internal surface of the pipe wall. The pins are aligned so as to provide a slidable cooperative engagement of the base means and pipe beveling rotary cutting tool with the end of the pipe to be beveled, wherein the pipe end can be rotated while the pipe beveling rotary cutting tool is stationary while beveling the pipe end or the pipe beveling rotary cutting tool can be rotated about the wall of the pipe end being beveled while holding the pipe stationary. Preferably, four pins are used, two being radially spaced, one on each side of the pipe beveling rotary cutting tool and extending in a direction parallel to the pipe along an external surface of the pipe wall and two being radially spaced, one on each side of the pipe beveling rotary cutting tool and extending in a direction parallel to the pipe along an internal surface of the pipe wall. However, it is contemplated that one pin may be used along the internal surface of the pipe wall wherein the pin is inserted in a hole aligned vertically beneath the rotary cutting tool.

The pipe beveling attachment further includes a safety shield secured to the base means. The safety shield extends along a top surface of the base means and continues partially along opposite ends of the base means. The safety shield further extends a predetermined distance beyond the planar first side of the base means over the cutting portion of the pipe beveling rotary cutting tool to protect an operator from flying pipe waste resulting from the cutting operation and to prevent an operator's fingers from coming into contact with the cutting tool.

The novel pipe beveling attachment further includes flexible rotational stopper means for preventing the base means from rotating when the rotary power tool, typically a circular power saw, is at idle. The flexible rotational stopper means is secured at a predetermined location on the second side of the base means and adapted to cooperatively engage a portion of the rotary power tool. The flexible rotational stopper means is typically an elongate member of sufficient length such that an edge of a shield of the rotary power tool can come into contact with an end of the flexible rotational stopper means when the pipe beveling attachment is attached to a circular power saw.

The present invention also includes an optional alignment pin fixedly attached to the one end of the means for securing the arbor sleeve adapter assembly to the rotary power tool juxtaposed the rotary power tool, the alignment pin being adapted to engage an aperture in a circular power saw retainer washer when the rotary power tool is a circular power saw.

The present invention can be attached to rotary power tools such as a drill, lathe or preferably a circular power saw. Utilizing the attachment with a circular power saw enables the operator to perform both cutting and beveling operations with a single tool and with no delays between operations.

The arbor sleeve adapter assembly accommodates standard size shanks for rotary cutting tools thereby facilitating swapping bits with different bevel angles or replacing worn bits. The attachment is further designed to permit the operator to bevel a pipe which is held stationary as well as a pipe that is rotated while applying the bevel. This flexibility is beneficial when working under various field conditions and in accommodating user preferences.

The present invention is ideal for use beveling ends of pipes that are to be glued, sealed or force fit. It can be used for beveling ends of pipes ranging from approximately 2 inches in diameter and larger with various wall thicknesses, especially thick-walled high pressure water mains and sewer pipes, such as C-900 pipe, where the angle and uniformity of the bevel are critical.

The present invention therefore provides a simple straight forward design which results in a low cost alternative to the current tools available and methods for beveling pipes in the field.

BRIEF DESCRIPTION OF THE DRAWINGS

For a fuller understanding of the nature and objects of the invention, reference should be made to the following detailed description, taken in connection with the accompanying drawings, in which:

FIG. 4 is a cross-sectional view of the attachment depicted in FIG. 1 showing the relationship of the various parts of an example of a practical application of the present invention;

FIG. 5 is an exploded cross-sectional view of the attachment of FIG. 1 showing the relationship of the various parts of the example of the practical application of the present invention;

FIG. 6 is an end view of the invention looking from the perspective of the inside of the pipe being beveled toward the attachment and taken from view B—B of FIG. 4; and FIG. 7 is an end view of the beveled pipe looking from the perspective of the planar first surface of the base member toward the inside of the pipe being beveled and taken from view A—A of FIG. 4.

DETAILED DESCRIPTION OF THE INVENTION

Figure 1:
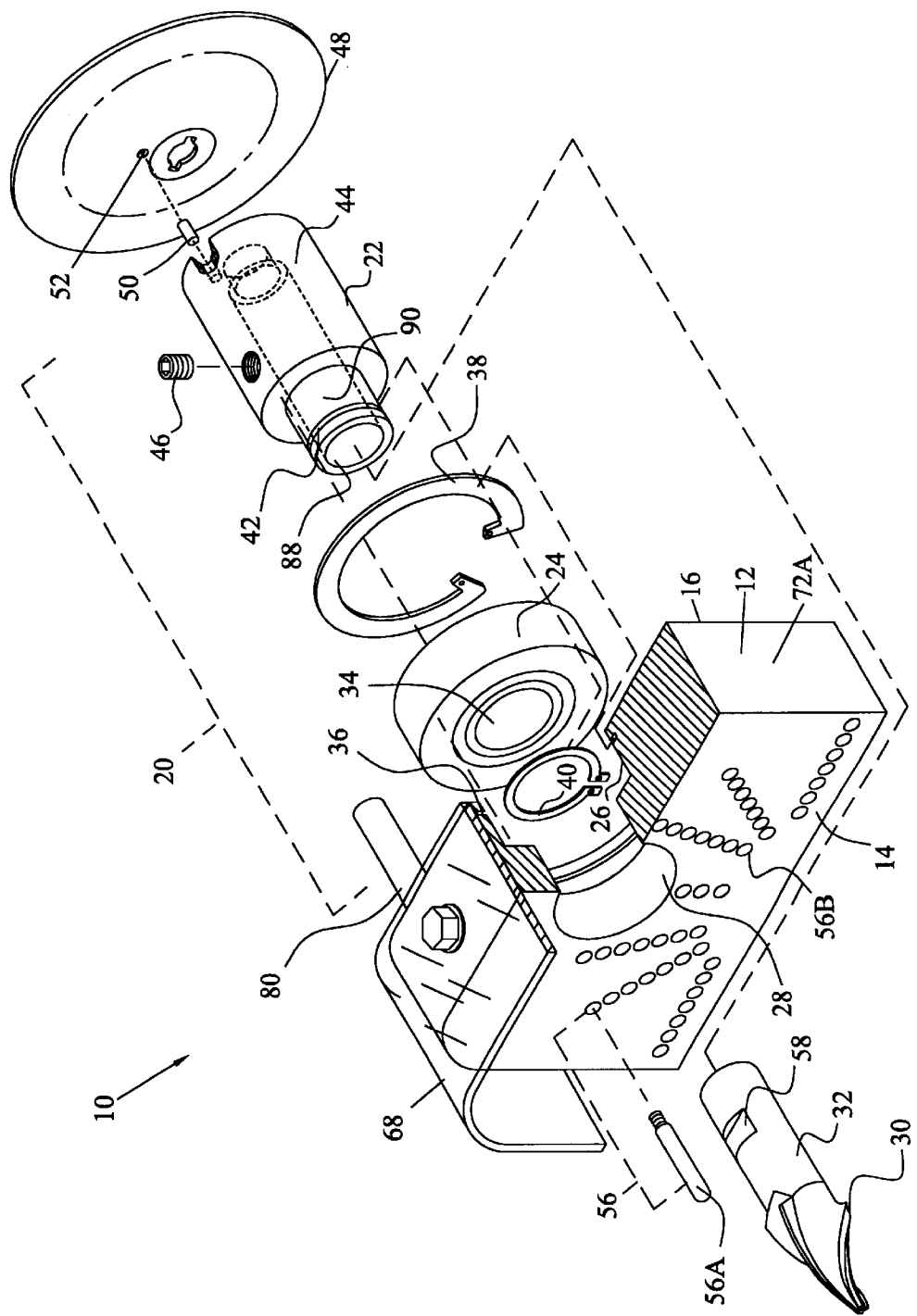
FIG. 1 is a perspective exploded view of a practical application of the present invention.

Referring now to the drawings, in particular FIG. 1, the invention which is a pipe beveling attachment for a rotary power tool, depicted generally as 10, comprises a base means 12 having a planar first side 14 and an opposite second side 16, and an arbor sleeve adapter assembly 20 for mounting the base means 12 to the rotary power tool 18.

The arbor sleeve adapter assembly 20 includes means 22 for securing the arbor sleeve adapter assembly 20 at one end to the rotary power tool 18. Bearing means 24, typically a sealed ball bearing ring bushing, is secured to the opposite second side 16 of the base means 12 and retained within the base means 12 in a recessed area 26. The base means 12 includes an aperture 28 therethrough for receiving a pipe beveling rotary cutting tool 30. The aperture 28 is concentric with the recessed area 26, so that a shank 32 of the pipe beveling rotary cutting tool 30 may extend through the aperture 28 from the planar first side 14 of the base means 12, through an aperture 34 of the bearing means 24 and secured to the means 22 for securing the arbor sleeve adapter assembly 20 to the rotary power tool 18. The shank 32 is secured inside means 22 with set screw 46.

The base means 12 can be made from a variety of materials including stainless steel, carbon steel, aluminum, aluminum alloys, fiber reinforced polymer, nylon, co-polymers or other similar materials durable for industrial machining applications or field use. The base means first side 14 is generally planar to provide a flat surface against which the edge of the pipe end 62 being beveled can come in contact, thereby obtaining a symmetrical beveling of a pipe end 62. See FIG. 3. The opposite second side 16 of the base means 12 need not be planar, although in most applications using steels, it is expected that it would be cost effective to manufacture the surface relatively planar. When polymers or other similar materials are used for the base means 12, the opposite second side 16 may have a surface shape which is irregular, that is, thicker in some portions than others to provide some measure of additional strength in higher stressed areas such as in the vicinity of the aperture 28.

In a practical application of the present invention, the arbor sleeve adapter assembly 20 may include, in combination with a sealed bearing 24, an adapter sleeve comprising a chuck portion 44 having a cylindrical portion 90 with a groove 42 for receiving retainer ring 40. The cylindrical portion 90 extends into the aperture 28 of the base means 12 from the opposite second side 16 of the base means 12 toward the planar first side 14 of the base means 12. The adapter sleeve is a practical application of the means 22 for securing the arbor sleeve adapter assembly 20 at one end to the rotary power tool 18. Typically, means 22 has a bore 88 which extends a predetermined distance through the chuck portion 44, whereupon a smaller bore continues therethrough at the end closest the tool 18. The smaller bore is adapted to receive a standard arbor bolt, for example a ⅝ inch threaded hex head or cap bolt or screw, generally found on circular power saws. The surface area between the smaller bore and the larger bore also provides for a surface against which the head of the bolt can seat when tightened.

The bearing 24 is typically inserted in the recessed are 26 and retained in that position with a retaining ring 38 snapped into groove 36. The extended machine portion of the chuck portion 44 may then be retained within the base means 12 by using the retaining ring 40 snapped into groove 42 after the cylindrical portion 90 has been inserted through the center of the bearing 24. The surface area of the retaining ring 40 is juxtaposed the surface of the side of the bearing 24 thereby holding the arbor sleeve adapter assembly 20, including the bearing means 24, in unity with the base means 12.

Of course, the above-described practical application is not limited to that described. Other methods may be applied such as the use of quick disconnect snap on technologies. Further, when a rotary power tool such as a drill is being used, a bit adapted to insert the drill may be provided at the end of means 22.

Figure 2:
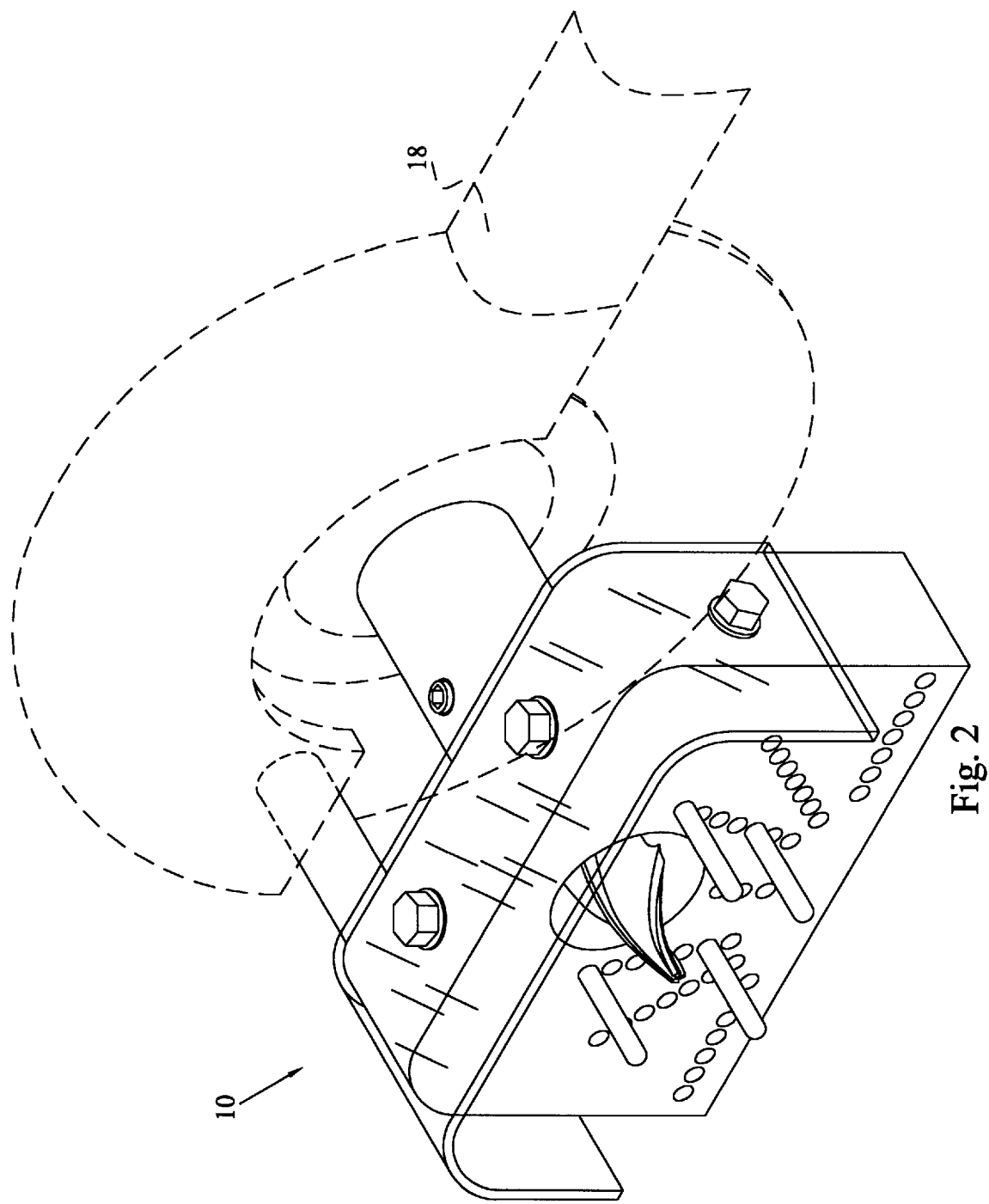
FIG. 2 is a perspective view of the novel attachment mounted to a circular power saw shown in phantom.
Figure 3:
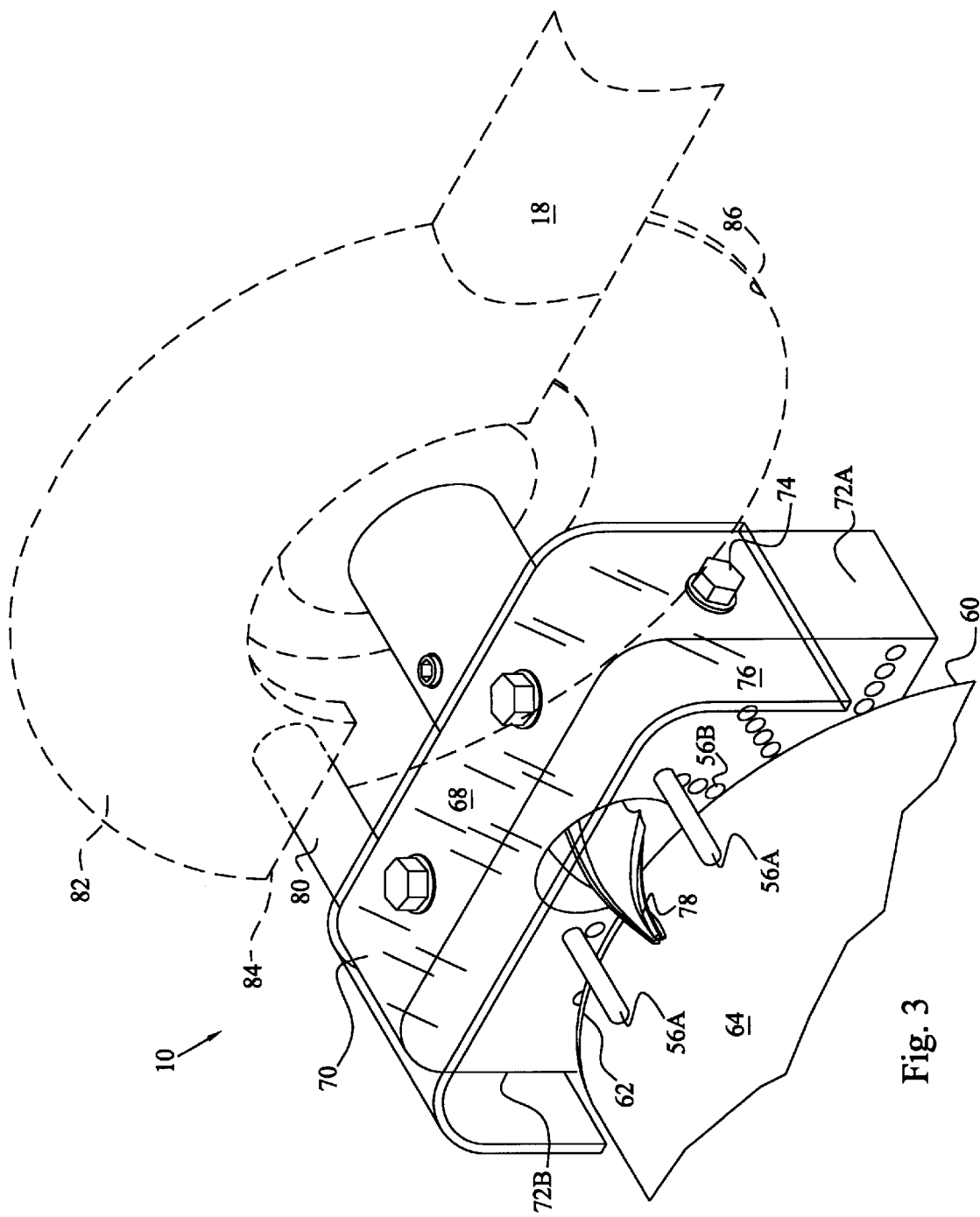
FIG. 3 is a perspective of the view of FIG. 2 with the addition of the depiction of a pipe end being beveled by the novel invention.

In a preferred embodiment, the present invention 10 would be attached to a circular power saw 86 as depicted in FIGS. 2 and 3. As previously stated however, the means 22 for securing the arbor sleeve adapter assembly 20 at one end to a rotary power tool 18 may include means adapted to mount the pipe beveling attachment 10 to a lathe, a portable drill and a drill press among other similar industrial tools.

Figure 8:
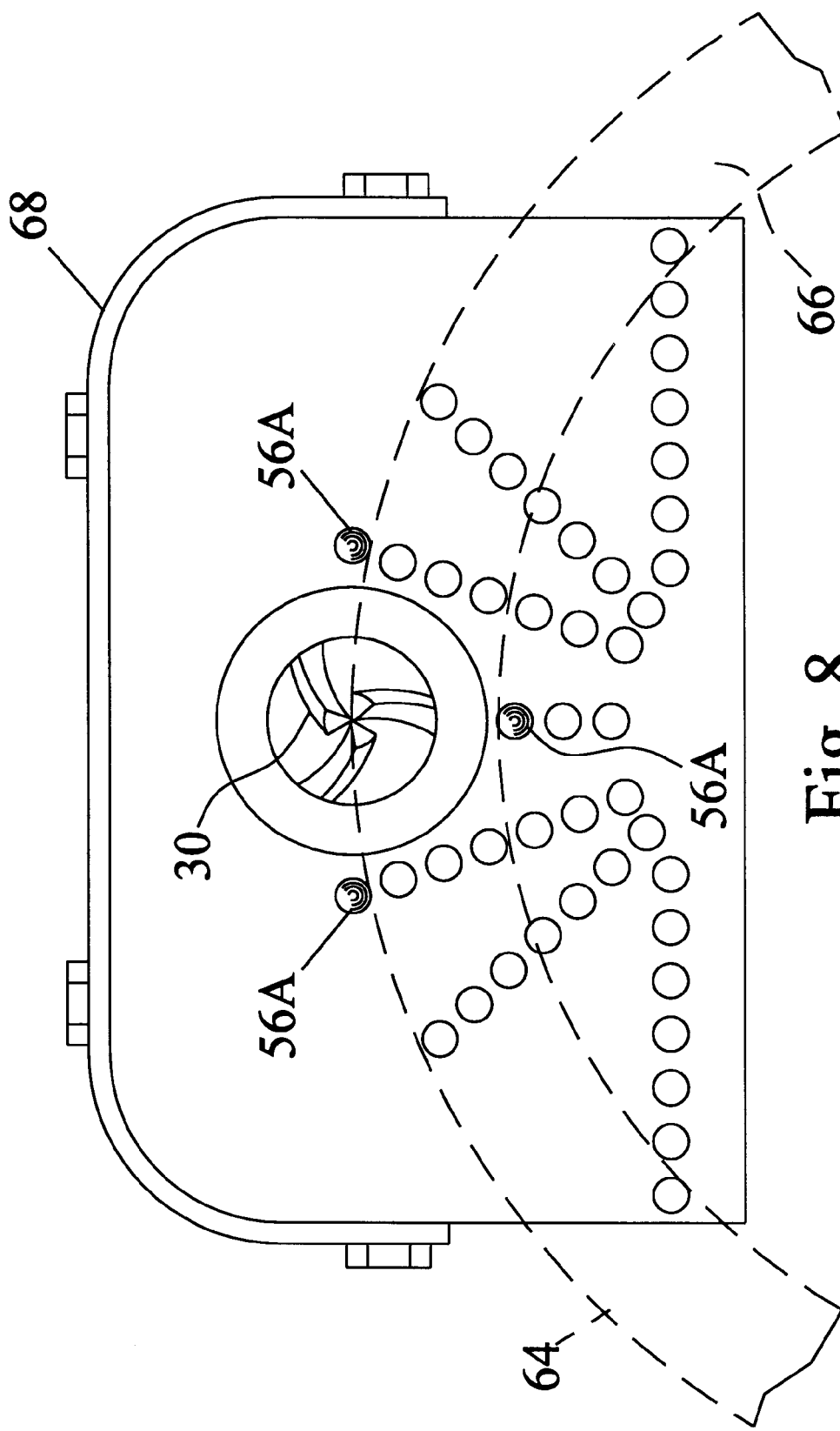
FIG. 8 is an end view of one embodiment of the invention depicting the use of three pins.

As shown in FIGS. 1–8, the planar first side 14 of the base means 12 includes pipe alignment and guide means 56 for cooperatively engaging a pipe wall 60 of a pipe end 62 to be beveled. The pipe alignment and guide means 56 is adjustable to accommodate different diameter and thickness pipes. The pipe alignment and guide means 56 further includes a plurality of holes 56B, each at a predetermined depth in a predetermined spaced-apart relationship for receiving one of at least three removable elongate pins 56A. Each of the at least three removable elongate pins 56A are insertable into a predetermined one of the plurality of holes 56B so as to slidingly engage the pipe wall 60 of the pipe end to be beveled 62. Two of the pins 56A are radially spaced, one on each side of the pipe beveling rotary cutting tool 30 and extend in a direction parallel to the pipe along an external surface 64 of the pipe wall 60 and at least one of the at least three pins 56A extends in a direction parallel to the pipe along an internal surface 66 of the pipe wall 60. The pins are aligned so as to provide a slidable cooperative engagement of the base means 12 and pipe beveling rotary cutting tool 30 with the end 62 of the pipe to be beveled. With such an arrangement, the pipe end 62 can be rotated while the pipe beveling rotary cutting tool 30 is stationary while beveling the pipe end 62 or the pipe beveling rotary cutting tool 30 can be rotated about the wall 60 of the pipe end 62 being beveled while holding the pipe stationary. This feature is convenient for an operator. Should the pipe be fixed or too long to handle, then the combination rotary power tool 18 and pipe beveling attachment 10 can be rotated about the pipe end 62; otherwise, the rotary power tool 18 with attached pipe beveling attachment 10 can be fixed and the pipe end 62 can be rotated against the planar first side 14 of base means 12 between the pins 56A. Preferably, four pins 56A are used, two being radially spaced, one on each side of the pipe beveling rotary cutting tool 30 and extending in a direction parallel to the pipe along an external surface 64 of the pipe wall 60 and two pins 56A being radially spaced, one on each side of the pipe beveling rotary cutting tool 30 and extending in a direction parallel to the pipe along an internal surface 66 of the pipe wall 60. However, it is contemplated that one pin 56A as shown in FIG. 8 may be used along the internal surface 66 of the pipe wall 60 wherein the pin 56A is inserted in a hole 56B aligned vertically beneath the rotary cutting tool 30.

In a practical application of the pipe alignment and guide means 56, pins 56A have a threaded portion for screwing into threaded holes 56B in the base means 12. Other methods of attachment are possible such as a close fit where the pins 56A are simply pushed into a bore or hole 56B. It is recommended that the pins be made of carbon steel, aluminum, aluminum alloys, stainless steel, or other similar and durable materials. Should the base means 12 be made from materials other than a metallic materials, it is recommended, although not necessary, that the holes 56B have a threaded insert to receive the threaded pins 56A. Such a feature will provide more durability to the alignment and guide feature of the present invention 10.

A safety shield 68 is secured to the base means 12. The safety shield 68 is typically made of a clear plastic material and extends along a top surface 70 of the base means 12. The safety shield 68 continues partially along opposite ends 72A, 72B of the base means 12. The safety shield 68 can continue the length of the opposite ends 72A, 72B, but in most cases, extending approximately one-half the distance down the opposite ends 72A, 72B should be satisfactory to meet safety requirements. In addition, the safety shield 68 further extends a predetermined distance 76 beyond the planar first side 14 of the base means 12 over the cutting portion 78 of the pipe beveling rotary cutting tool 30. The safety shield 68 can protect an operator from flying pipe waste resulting from the cutting operation as well as act to prevent an operator's fingers from inadvertently coming in contact with the cutting portion 78 of the cutting tool 30. There are many alternatives to mounting the safety shield 68 on the base means 12, although the simplest way is shown in the drawings by using bolts 74.

An optional feature of the invention 10 includes a flexible rotational stopper means 80 for preventing the base means 12 from rotating when the rotary power tool 18 is at idle, In a practical application of the invention, the flexible rotational stopper means 80 is secured at a predetermined location on the second side 16 of the base means 12 and adapted to cooperatively engage a portion of the rotary power tool 18. Typically, the stopper means 80 is an elongate member which can be formed by a dowel pressed fitted into the base means 12 at or near one of the corners of the second side 16 of the base means 12 wherein a rubber or polyethylene tube or tube made from similar flexible materials is clamped onto the dowel. The flexible tube would extend beyond the dowel a sufficient length so that its end would come into contact with a portion of the rotary power tool 18 such as the bottom edge 84 of the saw blade shield 82. The combined dowel and tube form the elongate member. This should prevent the unnecessary rotation of the pipe beveling attachment 10 when the rotary power tool 18, particularly, a circular power saw 86, is at idle.

Another alternative embodiment to the means 22 for securing the arbor sleeve adapter assembly 20 at one end to the rotary power tool 18 includes an optional alignment pin 50 fixedly attached to the one end of the means 22 for securing the arbor sleeve adapter assembly 20 to the rotary power tool 18. The alignment pin 50 is located juxtaposed the rotary power tool 18. The alignment pin 50 is adapted to engage an aperture 52 in a circular power saw retainer washer 48 when the rotary power tool 18 is a circular power saw. Although this feature is optional, it provides additional assurances that the pipe beveling attachment 10 will not slip against the saw retainer washer 48.

The present invention can be used with standard or customized pipe beveling rotary cutting tools 30 which are designed to cut steel pipe, castings, as well as PVC pipes.

As seen from the foregoing description, the present invention satisfies a long felt need to provide a device which can be effectively used in the field to prepare ends of pipes such as those found and used in water mains and sewer lines. When used with a circular power saw, the combined saw and attachment 10 can be used to cut the end of the pipe to square off the end or to cut the length of pipe necessary and, without any disassembly, immediately bevel the pipe end, thereby providing valuable cost savings in the construction and fabrication industries related to the installation and repair of utility pipes.

The invention is clearly new and useful. Moreover, it was not obvious to those of ordinary skill in this art at the time it was made, in view of the prior art considered as a whole as required by law.

It will thus be seen that the objects set forth above, and those made apparent from the foregoing description, are efficiently attained and since certain changes may be made in the above construction without departing from the scope of the invention, it is intended that all matters contained in the foregoing construction or shown in the accompanying drawings shall be interpreted as illustrative and not in the limiting sense.

It is also to be understood that the following claims are intended to cover all of the generic and specific features of the invention herein described, and all statements of the scope of the invention which, as a matter of language, might be said to fall therebetween.

Now that the invention has been described,
What is claimed is:

1. A pipe beveling attachment for a rotary power tool, the attachment comprising:

base means having a planar first side and an opposite second side;

an arbor sleeve adapter assembly for mounting the base means to the rotary power tool;

the arbor sleeve adapter assembly including means for securing the arbor sleeve adapter assembly at one end to the rotary power tool;

bearing means secured to the opposite second side of the base means, the bearing means being retained within the base means in a recessed area;

the base means further including an aperture therethrough for receiving a pipe beveling rotary cutting tool, the aperture being concentric with the recessed area, wherein a shank of the pipe beveling rotary cutting tool may extend through the aperture from the planar first side of the base means, through an aperture of the bearing means and secured to the means for securing the arbor sleeve adapter assembly to the rotary power tool;

the planar first side of the base means including pipe alignment and guide means for cooperatively engaging a pipe wall of a pipe end to be beveled, wherein the pipe alignment and guide means is adjustable to accommodate different diameter pipes;

the pipe alignment and guide means including a plurality of holes in a spaced-apart relationship for receiving one of at least three removable elongate pins; and each of the at least three removable elongate pins being insertable into one of the plurality of holes so as to slidingly engage the pipe wall of the pipe end to be beveled, two of the at least three removable elongate pins being radially spaced, one on each side of the pipe beveling rotary cutting tool and extending in a direction parallel to the pipe along an external surface of the pipe wall and at least one of the at least three removable elongate pins extending in a direction parallel to the pipe along an internal surface of the pipe wall, wherein the three removable elongate pins are aligned so as to provide a slidable cooperative engagement of the base means and pipe beveling rotary cutting tool with the end of the pipe to be beveled, and wherein the pipe end can be rotated while the pipe beveling rotary cutting tool is stationary while beveling the pipe end or the pipe beveling rotary cutting tool can be rotated about the wall of the pipe end being beveled while holding the pipe stationary.

2. The pipe beveling attachment according to claim 1, further including a safety shield secured to the base means, the safety shield extending along a top surface of the base means and continuing partially along opposite ends of the base means, the safety shield further extending beyond the planar first side of the base means over the cutting portion of the pipe beveling rotary cutting tool, whereby the safety shield can protect an operator from flying pipe waste resulting from the cutting operation.

3. The pipe beveling attachment according to claim 1, further including flexible rotational stopper means for preventing the base means from rotating when the rotary power tool is at idle, the flexible rotational stopper means being secured on the second side of the base means and adapted to cooperatively engage a portion of the rotary power tool.

4. The pipe beveling attachment according to claim 3, wherein the flexible rotational stopper means is an elongate member.

5. The pipe beveling attachment according to claim 4, wherein the elongate member is of sufficient length such that an edge of a shield of the rotary power tool can come into contact with an end of the flexible rotational stopper means when the pipe beveling attachment is attached to a circular power saw.

6. The pipe beveling attachment according to claim 1, wherein the means for securing the arbor sleeve adapter assembly at one end to the rotary power tool further includes an alignment pin fixedly attached to the one end of the means for securing the arbor sleeve adapter assembly to the rotary power tool juxtaposed the rotary power tool, the alignment pin adapted to engage an aperture in a circular power saw retainer washer when the rotary power tool is a circular power saw.

7. The pipe beveling attachment according to claim 1, wherein one of said one of at least three removable elongate pins extends in a direction parallel to the pipe along the internal surface of the pipe wall, said one of said one of at least three removable elongate pins being located in one of the plurality of holes vertically aligned beneath the rotary cutting tool.

8. The pipe beveling attachment according to claim 1, wherein two of said one of at least three removable elongate pins are radially spaced, one on each side of the pipe beveling rotary cutting tool and extend in a direction parallel to the pipe along the internal surface of the pipe wall.

9. A pipe beveling attachment for a circular power saw, the attachment comprising:

base means having a planar first side and an opposite second side;

an arbor sleeve adapter assembly for mounting the base means to the circular power saw;

the arbor sleeve adapter assembly including means for securing the arbor sleeve adapter assembly at one end to the circular power saw;

bearing means secured to the opposite second side of the base means, the bearing means being retained within the base means in a recessed area;

the base means further including an aperture therethrough for receiving a pipe beveling rotary cutting tool, the aperture being concentric with the recessed area, wherein a shank of the pipe beveling rotary cutting tool may extend through the aperture from the planar first side of the base means, through an aperture of the bearing means and secured to the means for securing the arbor sleeve adapter assembly to the circular power saw;

the planar first side of the base means including pipe alignment and guide means for cooperatively engaging a pipe wall of a pipe end to be beveled, wherein the pipe alignment and guide means is adjustable to accommodate different diameter pipes;

the pipe alignment and guide means including a plurality of holes in a spaced-apart relationship for receiving one of at least three removable elongate pins;

flexible rotational stopper means for preventing the base means from rotating when the circular power saw is at idle, the flexible rotational stopper means being secured on the second side of the base means, the flexible rotational stopper means being an elongate member, wherein the elongate member is of sufficient length such that an edge of a shield of the circular power saw can come into contact with an end of the flexible rotational stopper means; and each of the at least three removable elongate pins being insertable into one of the plurality of holes so as to slidingly engage the pipe wall of the pipe end to be beveled, two of the at least three removable elongate ping being radially spaced, one on each side of the pipe beveling rotary cutting tool and extending in a direction parallel to the pipe along an external surface of the pipe wall and at least one of the at least three removable elongate pins extending in a direction parallel to the pipe along an internal surface of the pipe wall, wherein the removable elongate pins are aligned so as to provide a slidable cooperative engagement of the base means and pipe beveling rotary cutting tool with the end of the pipe to be beveled, and wherein the pipe end can be rotated while the pipe beveling rotary cutting tool is stationary while beveling the pipe end or the pipe beveling rotary cutting tool can be rotated about the wall of the pipe end being beveled while holding the pipe stationary.

10. The pipe beveling attachment according to claim 9, further including a safety shield secured to the base means, the safety shield extending along a top surface of the base means and continuing partially along opposite ends of the base means, the safety shield further extending beyond the planar first side of the base means over the cutting portion of the pipe beveling rotary cutting tool, whereby the safety shield can protect an operator from flying pipe waste resulting from the cutting operation.

11. The pipe beveling attachment according to claim 9, wherein the means for securing the arbor sleeve adapter assembly at one end to the circular power saw further includes an alignment pin fixedly attached to the one end of the means for securing the arbor sleeve adapter assembly to the circular power saw, the alignment pin adapted to engage an aperture in a circular power saw retainer washer.

12. The pipe beveling attachment according to claim 9, wherein one of said three removable elongate pins extends in a direction parallel to the pipe along the internal surface of the pipe wall, said one of said three removable elongate pins being located in one of the plurality of holes vertically aligned beneath the rotary cutting tool.

13. The pipe beveling attachment according to claim 9, wherein two of said three removable elongate pins are radially spaced, one on each side of the pipe beveling rotary cutting tool and extend in a direction parallel to the pipe along the internal surface of the pipe wall.

* * * * *

UNITED STATES PATENT AND TRADEMARK OFFICE
CERTIFICATE OF CORRECTION

PATENT NO : 6,146,067

DATED : November 14, 2000

INVENTOR(S) : Paul Owens

It is certified that error appears in the above-identified patent and that said Letters Patent are hereby corrected as shown below:

Col. 10, line 5
replace "ping being radially spaced,"
with --pins being radially spaced,--.

Signed and Sealed this

Fifteenth Day of May, 2001

*Attest:*

NICHOLAS P. GODICI

*Attesting Officer*   Acting Director of the United States Patent and Trademark Office